United States Patent [19]

Berger et al.

[11] Patent Number: 5,216,729
[45] Date of Patent: Jun. 1, 1993

[54] ACTIVE ALIGNMENT SYSTEM FOR LASER TO FIBER COUPLING

[75] Inventors: Josef Berger, Santa Clara; Yishai Kagan; Doron Mick, both of Sunnyvale; Moshe Nazarathy, Palo Alto, all of Calif.

[73] Assignee: Harmonic Lightwaves, Inc., Santa Clara, Calif.

[21] Appl. No.: 793,825

[22] Filed: Nov. 18, 1991

[51] Int. Cl.⁵ .............................. G02B 6/26
[52] U.S. Cl. ............................ 385/31; 385/4
[58] Field of Search .................. 385/31, 24, 11, 32, 385/4

[56] References Cited

U.S. PATENT DOCUMENTS

| | | | |
|---|---|---|---|
| 4,512,036 | 4/1985 | Laor | 455/612 |
| 4,651,343 | 3/1987 | Laor | 455/600 |
| 4,722,586 | 2/1988 | Dodson et al. | 350/96.20 |
| 4,929,045 | 5/1990 | Fuller | 385/31 X |
| 4,978,190 | 12/1990 | Veith | 350/96.18 |
| 5,066,092 | 11/1991 | Droegemueller et al. | 385/31 X |

Primary Examiner—John D. Lee
Assistant Examiner—Phan T. Heartney
Attorney, Agent, or Firm—Schneck & McHugh

[57] ABSTRACT

A laser generates a beam which is actively steered into an optical element having a waveguide which receives and transmits the beam. The waveguide is coupled to an optical fiber which is also actively steered. Both the beam steering and fiber steering mechanisms seek to align the beam from the laser to the fiber for maximum output. The beam steering mechanism features a pair of planar mirrors pivoted at right angles to each other. A precision force transducer will cause desired amounts of pivoting to adjust the beam. The fiber steering mechanism features a pair of flexures, arranged with bending moments of the flexures being at right angles. Electrical signals control the extent of bending in each flexure. The amount of light in the fiber is sensed downstream from both steering mechanisms and compared to an expected amount. The resulting error signal is sensed and used as feedback in a servo loop to iteratively correct the two steering mechanisms in order to achieve the best alignment and maximum light output.

19 Claims, 3 Drawing Sheets

ACTIVE ALIGNMENT SYSTEM FOR LASER TO FIBER COUPLING

DESCRIPTION

1. Technical Field

The invention relates to fiber optic communications.

2. Background Art

In fiber optic communications, an objective is to couple as much optical power as possible from a beam source into a fiber. A typical configuration of the prior art is illustrated in FIG. 3. A laser light source 31 has a window 32 through which a coherent beam of light 30 is outwardly directed, usually in a divergent beam. A lens or lens system 33 collects the diverging beam and focuses the beam into an optical polarization maintaining fiber 34. The fiber is aligned to the lens as well to a waveguide of an optical element and glued permanently in place on both ends. The waveguide may have an input surface 35, with index-matching glue which matches the characteristics of the fiber to the waveguide of the optical element.

The waveguide may be in an optical element such as an electro-optical modulator 36 which has a waveguide 45. An output fiber 47 is adhered within a fiber holder 40 which joins the fiber to the waveguide at the output surface 41 of the electro-optical modulator. The glue used at opposite ends of the electro-optical element to adhere the fibers to the input and output surfaces is an optical glue that helps match the index of refraction of the electro-optical element and the fibers in order to reduce reflections.

An electrical driver 42 feeds a bias voltage signal to the electro-optical element, such as a Mach Zender electro-optical modulator, to maintain the proper operating point for waveguide operation as well as to supply signal for data transmission. With fibers that are glued at opposite ends of the optical element there are problems of misalignment over system temperature changes, misalignment after assembly, such as during the curing process, and change of optical properties of the glue over time. The modulator 36 requires that the optical fiber 34 coupling laser 31 to modulator 36 be polarization maintaining in order to operate properly. Such fibers are more difficult to make and are consequently more expensive than ordinary optical fibers.

In U.S. Pat. No. 4,978,190 G. Veith teaches that to minimize coupling losses from a laser light source, the core of a fiber should be precisely aligned with the laser diode. A servo system is used to control the coupling of light between the fiber waveguide and the beam by measuring differences in reflection between the core region of the fiber and the cladding region of the end face of the waveguide. An electro-mechanical positioning device moves a lens in x and y directions in accord with an error signal derived from a segmented optical detector. The servo moves the lens so that all segments of the detector are evenly struck. With this alignment system, use of glue is eliminated. While this system of the prior art is useful in some applications, it is desirable to have a system where the light coupling efficiency for light actually used in a transmission medium is known, rather than merely at the input.

An object of the invention is to devise an active coupling between a source and a transmission medium where light coupling between a source and a transmission medium is measured beyond the system input. Another object of the invention is to devise an apparatus for simultaneously coupling light into the input and from the output of an electro-optical modulator to an optical fiber.

SUMMARY OF THE INVENTION

The above objects have been achieved in a laser alignment system for an optical element, especially a fiber, but also systems including other elements, where a means for sensing the beam amplitude is located at a place where at least a portion of the beam has traversed a waveguide in the system. In the preferred embodiment, a beam amplitude sensing means is associated with a fiber which is downstream from an optical element through which the beam passes and which has a servo controlled beam steering means at its input for maximizing light coupled into the optical element. Optionally a fiber steering means may be used to adjust the position of the fiber relative to the optical element using a signal derived from the sensing means. In the latter situation, two light path adjustments are used including an adjustment of the beam into the optical element and an adjustment of the fiber relative to the output of the optical element. A servo error signal is obtained through an optical coupler associated with the fiber. This signal is then used to drive actuators which move the beam steering means, serving as an input for the optical element, and also move the fiber steering means located near the output of the optical element. The actuators are piezoelectric transducers which may be very finely controlled. Even though the beam sensing means is located in the fiber, the efficiency of coupling light into the upstream optical element may be adjusted because sensing of light downstream provides information regarding coupling efficiency upstream.

BEST MODE FOR CARRYING OUT THE INVENTION

Figure 1:
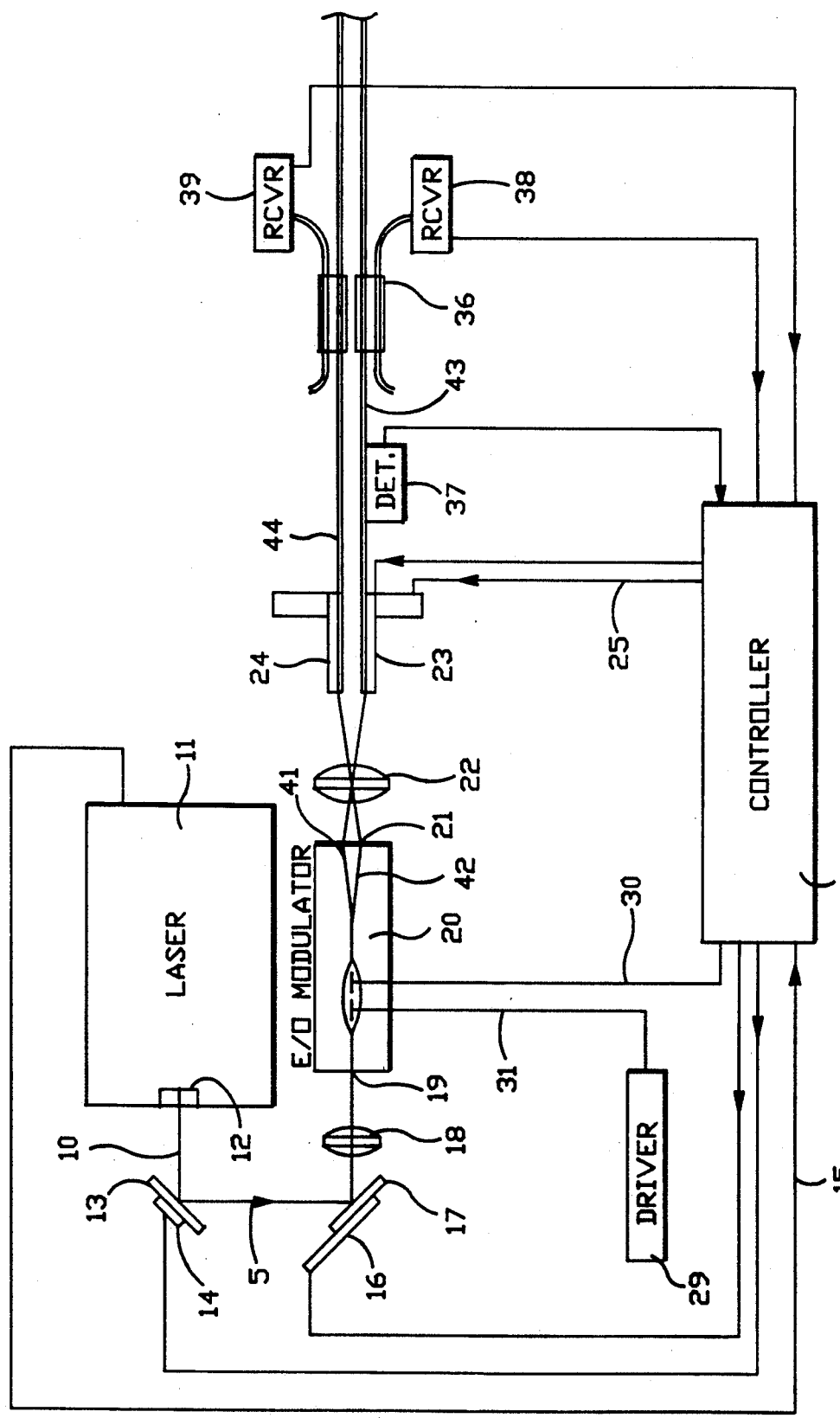
FIG. 1 is a plan view of the apparatus of the present invention.

With reference to FIG. 1, a laser 11 directs a beam 10 outwardly toward a first mirror 13. Laser 11 could be either a semiconductor diode laser or a solid state laser pumped by a laser diode or laser diode array. Beam 10, emerging through a window 12, is a low divergence beam as emitted by the solid state laser or as collimated by a lens inside laser 11. The beam should be polarized in order to match the preferred polarization of the waveguide in the electro-optic modulator. From mirror 13, the beam is directed by reflection to a second mirror 17 where the beam is again reflected. The two mirrors 13 and 17 are mounted on piezoelectric flexure elements 14 and 16 respectively. These flexure elements act like bimetallic strips, and each has the capability of adjusting the beam in one dimension in response to an electrical signal, preferably a voltage. The flexure elements are termed "bending motors" and are manufactured by Piezo Systems, Inc. of Cambridge, Mass. For example, if each mirror is mounted with a pivot axis, and force is applied to cause bending of the mount, beam deflection will occur. Although such deflection is angular, it appears to be linear at a plane intercepting the beam. The two flexure elements are able to move beam 10 in two perpendicular directions, corresponding to approximate x-y motion in an image plane so that the beam can be focused into the input aperture of an optical element, such as electro-optical modulator 20 where the x-y plane is transverse to the beam path. The beam which is steered by the two mirrors is focused by a lens 18 onto an anti-reflection coated surface 19 where there is an input aperture for a waveguide within modulator 20. Sometimes a tilted surface is used as an input surface and/or an output surface to prevent back reflection from coupling back to the light source 11.

The electro-optical modulator 20 receives a modulating signal along line 31 from a driver 29 which places communications information onto the input beam via a Mach-Zender section of the electro-optical modulator. The beam is split into two beams 41 and 42 by a coupler within the modulator. Dual push-pull beams are preferred in multi-channel vestigal sideband CATV analog communications applications. Light from the two waveguides of the modulator 20 pass through an output surface 21 which has an anti-reflection coating or employs a tilted surface. The beams may be divergent and need to be focused prior to entry into a fiber. A coupling lens 22 receives the two output beams and focuses the beams onto a pair of fiberoptic fibers 43 and 44, which are steerable as described below. It is also possible to hold the fibers in proximity to the output waveguides, i.e. within 5 microns, using an index-matching fluid or adhesive.

Each of the fibers is connected to an electromechanical transducer having the ability to move the fiber tip in two dimensions. Fiber 43 is connected to transducer 23 while fiber 44 is connected to transducer 24. The two transducers are piezoelectric flexures which are capable of moving the input ends of the fibers, which receive the two beams from lens 22, in an x-y plane. Motion is controlled via a pair of wires 25 for one transducer 23 and another pair of wires, not shown, for transducer 24. The wires 25 carry a voltage to each of two flexure arms which comprise the transducer 23. Application of voltage to each of the two arms induces flexing along the length of each flexure arm. The greater the voltage, the proportionally greater amount of flexing. Transducer 24 is controlled in the same manner. Like the flexures 14 and 16 for adjusting the mirrors 13 and 17, flexures 23 and 24 may be those termed "bending motors" sold by Piezo Systems, Inc. of Cambridge, Mass.

The fibers 43 and 44 are preferably single mode fibers which pass through an optical coupler 36 which samples light in each fiber. Approximately two percent of the light in each fiber is coupled to the optical receivers 38 and 39. These receivers provide an indication of the amount of light being fed through the fibers 43 and 44.

The controller 27 receives the outputs from receivers 38 and 39 and applies corrective feedback to the input transducers 14 and 16 of the electro-optical modulator 20 as well as the output transducers 23 and 24 of the fiberoptic fibers 43 and 44. Controller 27 also monitors the optical power output of laser 11 and receives a measure of this power for reference from the laser 11 via a signal line 15. Various optimizing strategies may be adapted. For example, the transducers 14 and 16 may be jointly moved so that the beam traces a circular or spiral pattern. Upon maximizing the amplitude from this motion, these transducers are then fixed in position and the transducers 23 and 24 are moved to a circular or spiral pattern until light in each fiber is again maximized.

A cladding mounted light detector 37 is positioned adjacent to one of the fibers to detect light leakage from the cladding. At the initialization of the system, if light is not being received at the receivers 38 and 39, the detector 37 is positioned to report whether light is observed in the cladding of the single mode fiber 43. In such a situation, there would be almost no light in the core of the fiber, since the receiver reports none. Light leakage reported in the cladding detector 37 indicates that the input mirrors should be moved to get maximum light into the electro-optical element waveguide. The piezoelectric transducers 23 and 24 are then moved to maximize light from the electro-optical modulator waveguide into the cores within the fibers. Mirrors 13 and 17 can also be adjusted to maximize light into waveguides of the modulator 20. Iterative adjustments between the beam steering transducers 14 and 16 and the fiber steering transducers 23 and 24 are made until light through the system is maximized.

Figure 2:
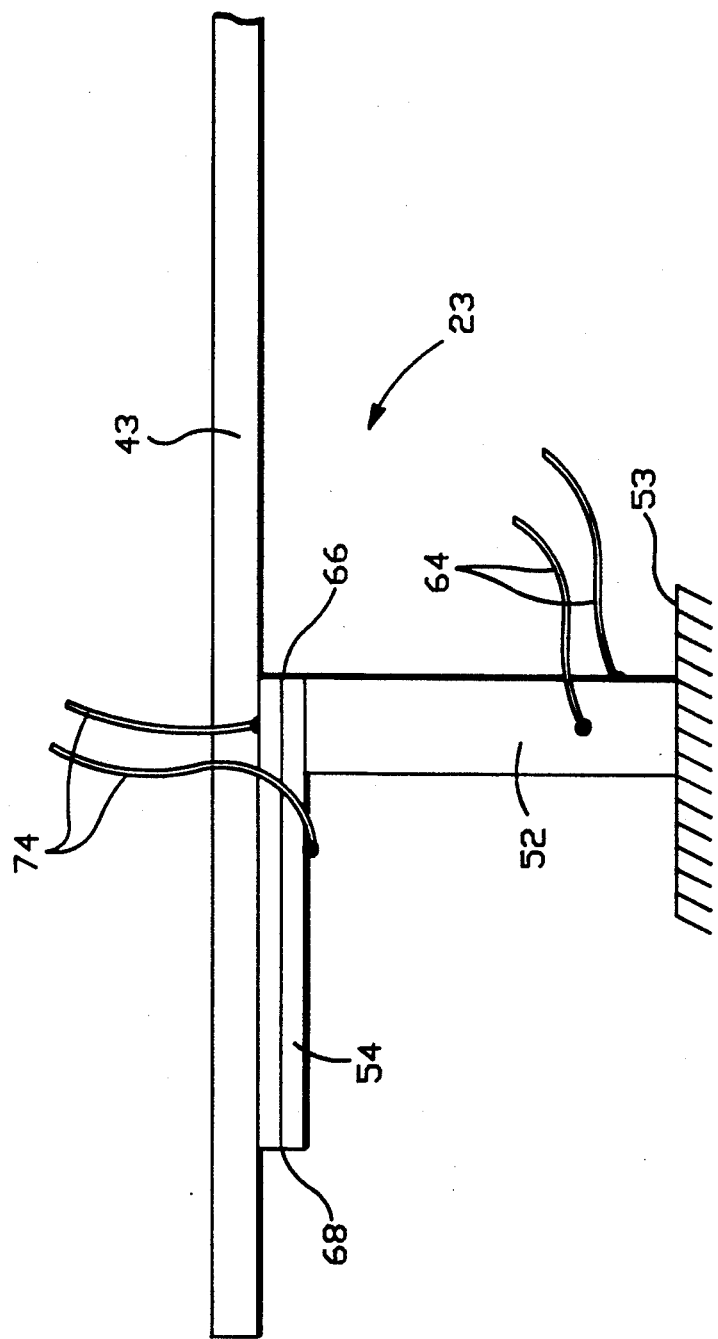
FIG. 2 is a detail of a fiber steering mechanism used in the apparatus of FIG. 1.
Figure 3:
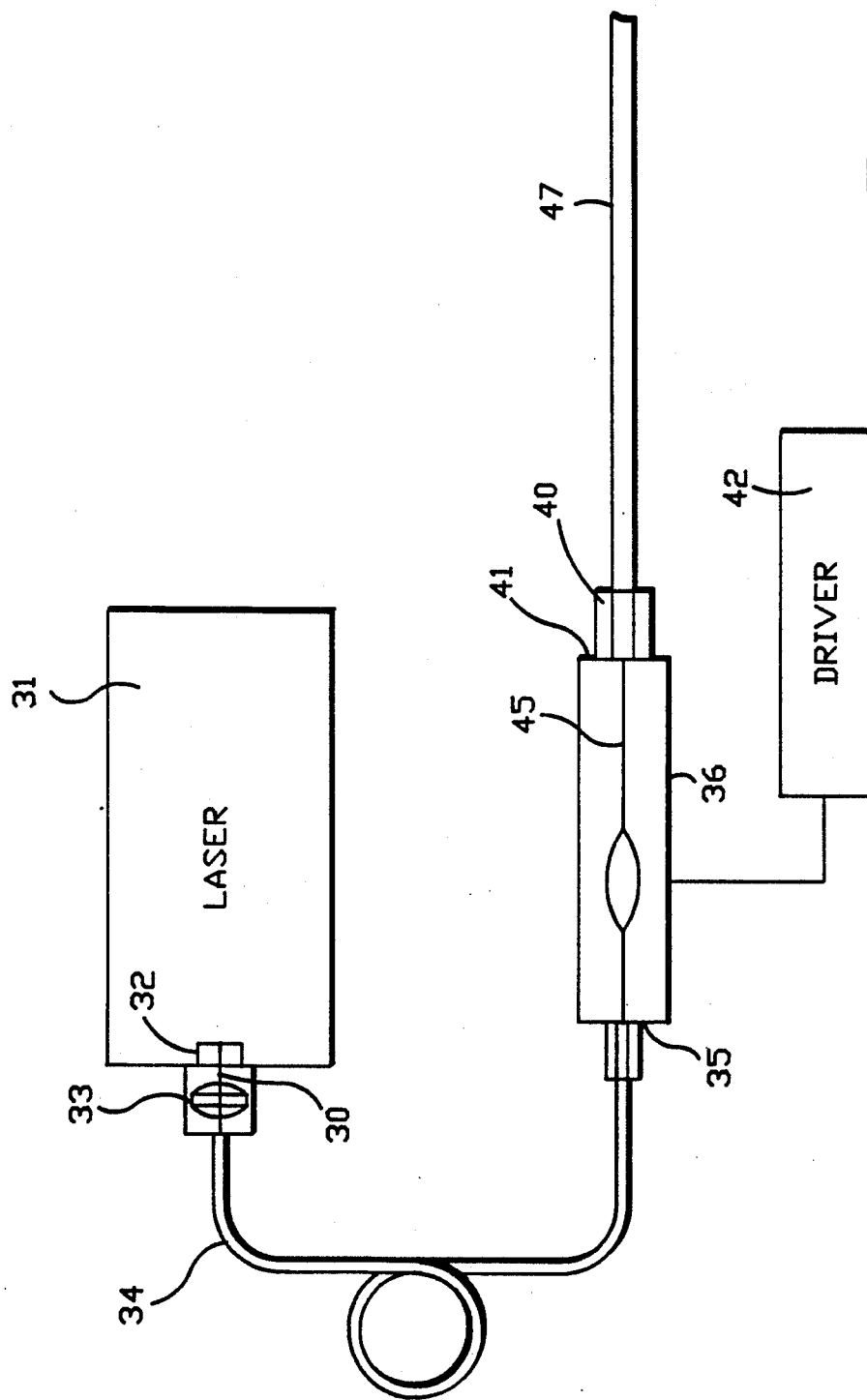
FIG. 3 is a plan view of a prior art approach in aligning a laser with a fiber through another optical element.

In FIG. 2, piezoelectric transducer 23, a fiber steering means, is seen. The transducers are made up of two flexure elements, including vertical element 52 and horizontal element 54. These elements flex in a manner similar to bimetal strips under thermal influence. The vertical flexure element 52 has a lower end which is constrained by a mounting surface 53. The upright flexure is able to flex along its length when voltage is applied, and is connected to horizontal flexure element 54 which is also able to flex along its length but in a plane perpendicular to the upright flexure. The horizontal flexure is in turn connected to fiber 43. A DC voltage along line 64 causes flexing of the piezoelectric element 52 into the plane of the paper for say positive voltage and out of the plane for negative voltage.

The horizontal flexure element 54, directly contacting fiber 43 is more constrained at a rearward end 66 than at a forward end 68. The flexure element 54 receives a DC voltage along line 74 for flexing in the plane of the paper similar to flexure element 52. The two dimensional motion of the two flexures is effective motion in the x-y plane for the tip of the fiber 43. The absolute amount of flexing is quite small, usually under plus or minus 20 microns in any particular direction. The size of each flexure element is approximately 10 millimeters in length, with approximate cross-sectional dimensions of 0.5 mm. by 4 mm. Each flexure is preferably made out of layers of piezoceramic, sometimes called bimorph piezoceramic. By applying DC voltages to each of the two piezoelectric elements the fiber 43 may be caused to scan a desired area in search for a maximum amount of light into the fiber core.

We claim:

1. A solid state laser or semiconductor laser alignment system for coupling light into an optical waveguide comprising, laser means for producing a narrow optical beam, an optical element having a central lengthwise waveguide spaced a distance from the laser means, the element having an input means for accepting said beam into the waveguide, means for sensing beam amplitude of light which has traversed at least a portion of the waveguide with reference to a predetermined amount and producing an error signal in response thereto, servo controlled beam steering means for receiving said error signal and using said error signal to deflect said beam into a central position within the waveguide whereby the amplitude of the beam in the waveguide is adjusted with reference to the predetermined amount, wherein said beam steering means comprises first and second mirrors, each of which is disposed in a beam path between said laser means and said optical element, the first mirror disposed to pivot in a first axis under control of a first actuator and the second mirror disposed to pivot in a second axis, different from the first axis, under control of a second actuator, whereby the two mirrors can direct the beam into the waveguide of the optical element.

2. The apparatus of claim 1 wherein said first and second actuators are piezoelectric transducers.

3. The apparatus of claim 1 wherein said optical element is an electro-optical modulator.

4. A solid state laser or semiconductor laser alignment system for coupling light into an optical waveguide comprising, laser means for producing a narrow optical beam, an optical element having a central lengthwise waveguide spaced a distance from the laser means, the element having an input means for accepting said beam into the waveguide, an optical fiber optically coupled to an output of said optical element for receiving said beam therefrom, means for sensing beam amplitude of light which has traversed the waveguide and at least a portion of said optical fiber with reference to a predetermined amount and producing an error signal in response thereto, and servo controlled beam steering means for receiving said error signal and using said error signal to deflect said beam into a central position within the waveguide whereby the amplitude of the beam in the waveguide is adjusted with reference to the predetermined amount, wherein said fiber is spaced apart from said waveguide and has optical fiber steering means for receiving said error signal and using said error signal to deflect said optical fiber into a central position relative to the beam for maximizing light in the core of the fiber.

5. The apparatus of claim 4 wherein passive optical coupler means is connected to an intermediate section of said optical fiber for diverting a small portion of light being transmitted within the fiber to a receiver means associated with the fiber for producing a signal representing the amplitude of light transmitted in the fiber.

6. The apparatus of claim 4 said fiber steering means comprises first and second transducers arranged to move said fiber in an x,y plane transverse to the direction of the beam whereby the beam can be centered relative to the core of the fiber.

7. The apparatus of claim 6 wherein said first and second transducers comprise first and second piezoelectric flexures.

8. The apparatus of claim 7 wherein said first and second flexures comprise members in an L-shape, having bending moments at right angles to each other.

9. The apparatus of claim 8 wherein said first and second flexures are attached to said fiber proximate to said optical element.

10. The apparatus of claim 4 wherein said fiber has a core surrounded by cladding a light detector means disposed adjacent to the cladding for measuring light in the cladding.

11. A solid state laser or semiconductor laser alignment system for coupling light into an optical waveguide and fiber comprising, laser means for producing a narrow optical beam, an electro-optical modulator having a waveguide with an entrance aperture spaced a distance from said laser means, the modulator having an input means for accepting said beam into said waveguide, an internal Mach Zender section and coupler for splitting the beam into a pair of push-pull beams and an output means for delivering said beams from said waveguide, a pair of single mode optical fibers each having a core surrounded by cladding, the fibers being movably mounted relative to the output means of said modulator, means for sensing beam amplitude of light which has traversed at least a portion of a fiber with reference to a predetermined amount of light and producing an error signal in response thereto, servo controlled beam steering means for receiving said error signal and using said error signal to deflect said beam into a central position within the waveguide whereby the amplitude of the beam in the waveguide is adjusted with reference to the predetermined amount, fiber steering means for receiving said error signal and using said error signal to deflect said beam into a central position within the core of the fibers whereby the amplitude of the beam in the waveguide and the fibers is adjusted with reference to the predetermined amount, and a light detector means disposed adjacent to the cladding of a fiber for measuring light in the cladding whereby the presence of light in the cladding indicates a large misalignment of the output fiber but allows control of the input beam coupling to the waveguide.

12. A solid state laser or semiconductor laser alignment system for coupling light into an optical waveguide comprising, laser means for producing a narrow optical beam, an electro-optical modulator having a waveguide with an entrance aperture spaced a distance from said laser means, the modulator having an input means for accepting said beam into said waveguide and an output means for delivering said beam from said waveguide, an optical fiber having a core surrounded by cladding, the fiber being movably mounted relative to the output means of said modulator, means for sensing beam amplitude of light which has traversed at least a portion of the fiber with reference to a predetermined amount of light and producing an error signal in response thereto, servo controlled beam steering means for receiving said error signal and using said error signal to deflect said beam into a central position within the waveguide whereby the amplitude of the beam in the waveguide is adjusted with reference to the predetermined amount.

13. The apparatus of claim 12 further defined by fiber steering means for receiving said error signal and using said error signal to deflect said beam into a central position within the core of the fiber whereby the amplitude of the beam in the waveguide and the fiber is adjusted with reference to the predetermined amount.

14. The apparatus of claim 12 wherein said core of the fiber has a light detector means disposed adjacent to the fiber cladding for measuring light in the cladding.

15. The apparatus of claim 12 wherein said beam steering means comprises first and second mirrors, each of which is disposed in a beam path between said laser means and said electro-optical modulator, the first mirror disposed to pivot in a first axis under control of a first actuator and the second mirror disposed to pivot in a second axis, different from the first axis, under control of a second actuator, whereby the two mirrors can direct the beam into the waveguide of the electro-optical modulator.

16. The apparatus of claim 15 wherein said first and second actuators are piezoelectric transducers.

17. The apparatus of claim 13 wherein said fiber steering means comprises first and second transducers arranged to move said fiber in an x,y plane transverse to the direction of the beam whereby the beam can be centered relative to the core of the fiber.

18. The apparatus of claim 17 wherein said first and second transducers comprise first and second piezoelectric flexures.

19. The apparatus of claim 18 wherein said first and second flexures comprise members in an L-shape, having bending moments at right angles to each other, one of said flexures having an end being fixed to a surface and the other of said flexures being attached to said fiber.

* * * * *